United States Patent
Irick, Jr.

(10) Patent No.: US 6,565,987 B2
(45) Date of Patent: May 20, 2003

(54) NON-EXUDING OPTICALLY BRIGHTENED POLYOLEFIN BLENDS

(75) Inventor: Gether Irick, Jr., Gray, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/438,860

(22) Filed: Nov. 12, 1999

(65) Prior Publication Data

US 2002/0136912 A1 Sep. 26, 2002

(51) Int. Cl.⁷ .................. B32B 27/10; G03C 1/76; B29C 47/00
(52) U.S. Cl. .................. 428/507; 428/511; 428/512; 428/513; 524/94; 264/464; 430/531; 430/536; 430/538
(58) Field of Search .................. 428/507, 511, 428/512, 513; 430/531, 538, 536; 524/94; 264/464

(56) References Cited

U.S. PATENT DOCUMENTS

| 3,260,715 A | | 7/1966 | Saunders ................ 548/219 |
| 3,322,680 A | | 5/1967 | Hedberg et al. ....... 252/301.24 |
| 3,449,257 A | | 6/1969 | Tuite et al. ............ 252/301.28 |
| 3,700,753 A | * | 10/1972 | Terada et al. ................ 428/379 |
| 3,887,640 A | * | 6/1975 | Diaz et al. ................ 428/512 |
| 4,188,220 A | * | 2/1980 | Kasugai et al. ............ 428/513 |
| 4,359,553 A | * | 11/1982 | Edwards .................... 525/240 |
| 4,794,071 A | | 12/1988 | Tomko et al. ............... 430/538 |
| 4,859,539 A | | 8/1989 | Tomko et al. ............... 428/512 |
| 4,921,781 A | * | 5/1990 | Takamuki et al. ........... 430/496 |
| 5,173,397 A | | 12/1992 | Noda et al. ................. 430/531 |
| 5,332,828 A | | 7/1994 | Wang ......................... 548/219 |
| 5,340,854 A | | 8/1994 | Martic et al. ................ 524/94 |
| 5,457,016 A | | 10/1995 | Dethlefs ..................... 430/531 |
| 5,998,119 A | * | 12/1999 | Aylward et al. ............. 430/536 |
| 6,071,654 A | * | 6/2000 | Camp et al. .................. 430/11 |
| 6,165,700 A | * | 12/2000 | Camp et al. ................. 430/531 |
| 6,287,743 B1 | * | 9/2001 | Oakland et al. ............. 430/201 |
| 6,312,822 B1 | * | 11/2001 | Irick, Jr. et al. ......... 428/479.6 |

FOREIGN PATENT DOCUMENTS

| WO | WO 98/0025998 | 6/1998 |
| WO | WO 99/61955 | 12/1999 |

* cited by examiner

Primary Examiner—Paul Thibodeau
Assistant Examiner—Monique R. Jackson
(74) Attorney, Agent, or Firm—Jonathan D. Wood; Bernard J. Graves, Jr.

(57) ABSTRACT

Optical brighteners are widely used for decreasing the apparent yellowness of polymeric materials. Polyethylene, as a coating film for photographic paper has presented unique problems because of its general lack of compatibility with conventional, large, fluorescent brightener molecules. The present invention provides a solution to this problem by incorporating into the polyethylene an optical brightener compatibilizing amount of a second polyolefin having alkyl groups pendant from the polymer backbone which serves to reduce the exudation of the optical brightener in articles or substrates comprised of or coated with such compositions.

20 Claims, No Drawings

NON-EXUDING OPTICALLY BRIGHTENED POLYOLEFIN BLENDS

FIELD OF THE INVENTION

This invention relates to the field of polymer chemistry. In particular, this invention relates to blends of optical brightening compounds and polyolefins.

BACKGROUND OF THE INVENTION

The use of polyolefins, such as polyethylene, has become quite prevalent. A particularly useful application of polyolefins has been for a class of photographic supports. The photographic support generally includes a paper base material having a polyolefin coating on one or both sides of the paper. The polyolefin coating provides a very smooth surface when thin layers of a silver halide emulsion, are desired to be coated on the photographic paper.

The polyolefin coating can include an optical brightener and typically, a fluorescent whitening agent to make the white areas of the support even brighter. The optical brightener compensates for the yellow cast produced by the absorption of short-wavelength light such as violet to blue by the polyolefin. Typical optical brighteners fluoresce upon irradiation with ultraviolet light emitting visible light, typically bluish in hue, replacing the light that would have been lost and thereby enhancing the brightness of the support. Optical brighteners for use in such fields as photographic printing materials must absorb ultraviolet light, especially in the region from 280 to 405 nanometers (nm), and re-emit such light so as to enhance the brightness of the print. Desirably, the optical brightener has stability to temperatures as high as 310° C. to 330° C., so that it may be incorporated into the polyolefin during an extrusion process or film forming process and in extruding the polyolefin onto the paper based material.

It is also desirable that the optical brightener be non-migrating so that it remains in the polyolefin coating and does not exude as a surface film on the polyolefin. Such exudation not only gives rise to a non-uniform brightness of the reflection surface, but also readily transfers to any other surface coming in contact with it. For example, a brightener transferred to the back side of the adjacent support layer when wound in roll can adversely affect subsequent coating and finishing operations of the photograph. This can result in the final product having a poor quality and performance.

It has been recognized that the addition of optical brighteners to polyolefins has been less than satisfactory. For example, U.S. Pat. No. 3,449,257 describes 2,5-bis (benzoxazolyl)thiophenes, such as Uvitex OB™ available from Ciba Specialty Chemicals, as non-migrating brighteners for hydrophobic polymers, but were found to undergo bleeding and yellowing from a polyolefin film in U.S. Pat. No. 5,173,397.

In an effort to improve the compatibility between hydrophobic or non-polar polyolefins and optical brighteners, U.S. Pat. Nos. 4,794,071 and 4,859,539 disclose a mixture of optical brighteners which when incorporated into a pigmented polyolefin layer of a photographic support minimizes exudation of the brightener at the polyolefin surface. The mixture of optical brighteners include certain fluorescent bis (benzoxazolyl)stilbenes. U.S. Pat. No. 4,794,071 teaches that single component optical brighteners exhibit severe exudation when compared to the optical brightener mixture described in U.S. Pat. No. 4,794,071.

Accordingly, there is a need for the ability to incorporate an optical brightener into a non-polar polyolefin that will exhibit good compatibility with the polyolefin and not exude as a surface film on the polyolefin.

Additionally, there is a need for a method of incorporating optical brighteners into hydrophobic or non-polar polyolefins which will enhance their brightening efficiency.

SUMMARY OF THE INVENTION

The present invention provides a composition comprising a polyolefin, an optical brightening compound, and a compatibilizing amount of a non-polar polyolefin polymer having alkyl groups of from 1 to 22 carbons pendant from the polymer backbone. In the practice of the invention, the components are blended at a temperature sufficient to induce softening of the polyethylene polymer, and may be extruded, injection molded, etc., into useful articles. The optical brightener is retained in these articles in these end-use applications to a much greater extent than they would have been in the absence of the non-polar polyolefin additive.

DETAILED DESCRIPTION OF THE INVENTION

The present invention provides a thermoplastic composition comprising a non-polar thermoplastic polymer, an optical brightener and a non-polar polyolefin additive in an amount effective to reduce exudation of said optical brightener from said non-polar thermoplastic polymer, wherein said non-polar polyolefin additive is a polyalkylene polymer having pendant alkyl substituents.

Although it is known that the addition of optical brightener into a non-polar thermoplastic such as a polyolefin will improve the brightness of a film made from the polyolefin, it has been recognized that such optical brightening agents are generally incompatible. Polyolefins are typically non-polar compositions and in general applications, such compositions possess very few if any polar functional groups, such as esters, acids or alcohols. This lack of polarity generally prevents polar materials such as, optical brighteners, from being satisfactorily incorporated into or bonded with the polyolefin. The non-compatibility contributes to the optical brightener exuding from the polyolefin. The present invention, as described herein shows that the addition of a non-polar polyolefin aditive to the polyolefin will substantially improve the incorporation of and reduce the exudation of the optical brightener from the polyolefin without affecting the optical brightener performance. Accordingly, the composition of the invention comprises a non-polar thermoplastic polyolefin having admixed, blended or melt-blended therein an optical brightener and a non-polar polyolefin additive for compatibilizing the optical brightener and the polyolefin. Although the invention hereafter is described with particular reference as a polyolefinic coating for an imaging (i.e., photographic) support, one skilled in the art will recognize and understand that other useful applications for such an optically brightened polyolefin may be utilized. These may include, but are not limited to fibers, adhesives, packaging and shipping containers, cartons, bottles, signs, re-processed polymer, coated paper for non-photographic applications (e.g., thermal, digital, and other imaging applications, and coatings for materials other than paper.

The thermoplastic polyolefin suitable for use in the invention can be any polyolefinic material known in the polymer art with particular relevance to the photographic art. Representative materials include homopolymers and copolymers of olefinic monomers such as ethylene, α-methyl styrene $C_3$–$C_8$ α-olefins, styrene, and mixtures thereof.

Preferred polyolefins include linear low density, low density, medium and high density polyethylene. Polyethylene having a density in the range from about 0.90 grams/cm³ to about 0.96 grams/cm³ being preferred and a density of about 0.910 grams/cm³ to about 0.925 grams/cm³ being particularly preferred. The olefinic monomer can be copolymerized with one or more additional monomer moieties such as esters, carboxylic acids, amides, alcohols and other olefins. Specific examples of copolymerizable monomers include vinyl stearate, vinyl acetate, acrylic acid, methyl acrylate, ethyl acrylate, butyl acrylate, acrylamide, methacrylic acid, methyl methacrylate, ethyl methacrylate, methacrylamide, butadiene, isoprene, and vinyl chloride. The polyethylenes may contain other materials commonly used as processing aids, or materials used to make the finished product perform better in a particular end-use. Such materials are set forth in copending application U.S. Ser. No. 08/986,539 and WO 98/0025998.

The optical brighteners useful in the practice of the invention can be any class of materials having an absorption in the range of about 280–405 nanometers (nm) and an emission in the visible spectrum of from about 400–450 nanometers. The most preferred optical brighteners include stilbenes, substituted stilbenes and stilbene derivatives. Examples of such optical brighteners include bis (benzoxazolyl) stilbenes such as those disclosed in U.S. Pat. No. 4,794,071, the disclosure of which is incorporated herein by reference. Preferably, the optical brighteners include the optical brightener EASTOBRITE® OB-1, a stilbene available from Eastman Chemical Company, Kingsport, Tenn. and described in U.S. Pat. Nos. 3,260,715 and 3,322,680, and HOSTALUX™ KS, a mixture of stilbenes (i.e., 4,4'-bis(Benzoxazol-2-yl)stilbene; methyl-4,4'-bis(benzoxazol-2-yl)stilbene; dimethyl-4,4'-bis(benzoxazol-2-yl)stilbene available from Clariant Corporation and described in U.S. Pat. No. 4,794,071, the entire disclosures of each being incorporated herein by reference.

Other optical brighteners include mono(azol-2-yl) stilbenes, such as, 2-(stilben-4-yl)naphthotriazoles and 2-(4-phenylstilben-4-yl)benzoxazoles;

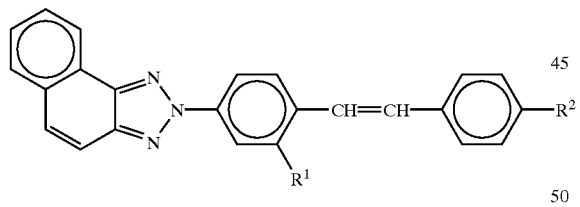

wherein $R^1$ is hydrogen or C≡N and $R^2$ is hydrogen or chlorine.

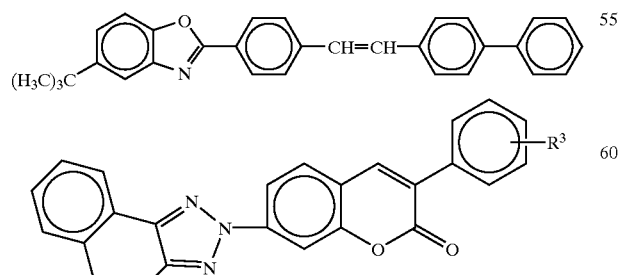

wherein $R^3$ is hydrogen or alkyl.

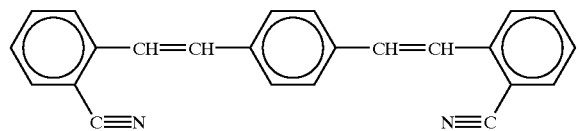

Bis(benzoxazol-2-yl) derivatives, such as:

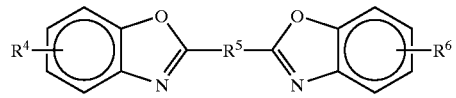

wherein $R^5$ is —CH=CH— and $R^4$ and $R^6$ are independently selected from alkyl or $CH_3$, $R^5$ is

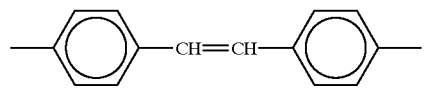

and $R^4$ and $R^6$ are independently selected from hydrogen and alkyl, $R^5$ is

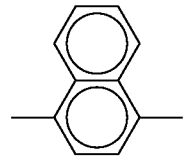

and $R^4$ and $R^6$ are independently selected from hydrogen, alkyl, COO-alkyl, and $SO_2$-alkyl, and $R^5$ is

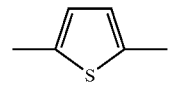

and $R^4$ and $R^6$ are independently selected from hydrogen and alkyl, wherein in all cases $R^5$ above represents a conjugated system.

Bis(benzimidazol-2-yl) derivatives of:

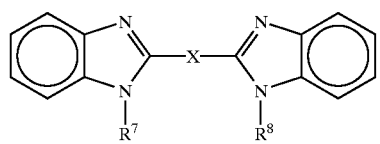

wherein X is —CH=CH— or

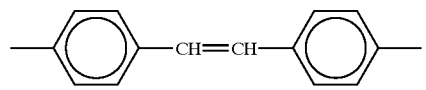

and $R^7$ and $R^8$ are independently selected from hydrogen, alkyl, hydroxyalkyl, and the like. While the brighteners described above are known to those skilled in the art, it is readily apparent that the invention can be applied to a wide variety of brighteners, which, because of their polar nature exhibit less than satisfactory compatibility with thermoplastic polyolefins.

The amount of optical brightener included in the polyolefin preferably ranges from about 0.001 to about 1.0 percent by weight based on the total weight of the polyolefin. More preferably, the amount of optical brightener is from about 0.01 percent to about 0.25 percent by weight based on the total weight of the polyolefin. Optionally, the brightener can be a mixture of one or more of the above identified optical brighteners. In an especially preferred embodiment, the optical brightener or optical brightener mixture will be: an unsubstituted 4,4'-bis(benzoxazol-2yl) stilbene brightener, such as EASTOBRITE® OB-1, available from Eastman Chemical Company; a mixture of unsubstituted and alkyl-substituted benzoxazolylstilbenes such as HOSTALUX™ KS, available from Clariant Corporation, or Gaoyou KSN, available from Jiangsu Gaoyou Auxiliary Factory, China). Preparation of these brighteners is also disclosed in U.S. Pat. No. 5,332,828. The mixtures typically consist of two or more benzoxazolylstilbenes having zero, one, and two alkyl substituents. The optical brightener concentration preferably varies from 0.001 wt % to about 1.0 wt %, depending on the end-use requirement; typical end-use concentrations will be in the range of 0.01 to 0.25 wt %.

In an especially preferred embodiment, the non-polar thermoplastic polymer is a polyethylene homopolymer or polyethylene interpolymer and has a density of from about 0.90 grams/cm$^3$ to about 0.96 grams/cm$^3$; the non-polar polyolefin additive is polypropylene; and the optical brightener is 4,4'-bis(benzoxazol-2-yl) stilbene, monomethyl-4,4'-bis(benzoxazol-2-yl)stilbene, dimethyl-4,4'-bis(benzoxazol-2-yl)stilbene or a mixture thereof.

The non-polar polyolefin additives useful in the practice of the invention are preferably dispersible in the polyolefin without introducing undesirable levels of color or odor. Preferred non-polar polyolefin additives are sufficiently compatible with the polyolefin so that they do not exhibit an undesirable level of exudation in the end use environment. The non-polar polyolefin additive should further preferably have a processing temperature that permits the non-polar polyolefin additive to be blended, and preferably melt-blended, with the polyolefin under normal processing conditions. Additionally, the non-polar polyolefin additives should not adversely degrade the properties of the polyolefins for their end use applications.

The non-polar polyolefin additive, i.e., the polyalkylene having pendant alkyl substituents, used as a compatibilizing agent can be a polyolefin, or a mixture of polyolefins, having alkyl groups pendant from the polymer backbone. The simplest cases are polypropylene and polybutene which have one alkyl group (methyl or ethyl) pendant from each two-carbon segment in the backbone. The class of polyolefins known as linear low-density polyethylenes (LLDPE) will have varying amounts of alkyl substitution, depending on the amount of co-monomer used with ethylene to produce the LLDPE (e.g., 1-butene and 1-hexene copolymers). A typical material might have alkyl substituents pendant from 5 to 15% of the two-carbon segments in the backbone. These alkyl substituents may be from 2 to 20 carbons in length, and may be single components or mixtures of polyolefins having substituents of from 1 to 20 carbons. Such non-polar polyolefin additives are preferably present in an amount of from about 0.5 weight percent to about 20 weight percent, based on the total weight percent of the non-polar polyolefin additive and the non-polar thermoplastic polymer. Further preferred is about 0.5 to 6 weight percent.

In a further embodiment, the present invention provides a method for reducing the exudation of optical brighteners in a thermoplastic composition comprising a non-polar thermoplastic polymer and an optical brightener which comprises blending with said composition and optical brightener, an exudation reducing amount of a non-polar polyolefin additive, wherein said non-polar polyolefin additive is a polyalkylene polymer having pendant alkyl substituents.

The components of this invention may be blended by any method which will provide good mixing without excessive degradation of one or more of the components. Concentrates of the optical brightener in a suitable polymer may be used, or the separate components may be blended together as pellets, powders and the like prior to melt-mixing; such methods are well-known in the art. Conventional melt mixing equipment such as Banbury mixers, continuous compounders, single or twin screw extruders and the like are typical, but not limiting examples of melt-mixing equipment. The materials may be molded into articles, extruded into film, extrusion coated onto substrates such as paper, paperboard, cardboard, other plastics, metals and the like. In the extrusion coating of substrates, the coating may be on one or both sides. The materials of this invention would be especially useful for extrusion coating of paper for photographic or reprographic applications. In such applications, it is preferred that the composition be applied to such substrates at a temperature of about 550–650° F.

Thus, in a further embodiment, there is provided an imaging support comprising a paper base material having a composition coated thereon, said composition comprised of a thermoplastic polymer, an optical brightener, and a non-polar polyolefin additive, wherein said non-polar polyolefin additive is a polyalkylene polymer having pendant alkyl substituents.

Experimental Section

EXAMPLE 1

A dry-blended mixture of 6.665 lbs (3023.2 grams) of low-density polyethylene, 3.33 lbs (1513.6 grams) of a concentrate containing 33.3 wt % of an anatase titanium dioxide in low-density polyethylene, and 0.005 lb (2.3 grams) of a mixture of 10% Optical Brightener A (Table 1) and 90% Optical Brightener C (Table 1) was blended at 375° F. in a single-screw extruder. The extrudate was pelletized and was then extruded at 350° F. into 3-mil (75 micron) thick film.

EXAMPLE 2

Color measurements (Commission International d'Eclairage L*a*b* values in a Spectroflash 600 unit using D65 illuminant with ultraviolet included, and 10 degree observer) were made on the film of Example 1 and the film was then aged in a Blue M convection oven at 60° C. for 88 hours and the color measurements repeated. The change in b* value was taken as a measure of the rate of exudation of the optical brightener from the film.

The larger the numerical value of the negative numbers, the brighter (bluer) the sample will appear. The larger the numerical value of the positive numbers, the yellower the sample will appear. Films containing no optical brightener will typically exhibit b* values of from 0 to −1.0.

EXAMPLE 3

Example 1 was repeated, but with the addition of a 4.2 melt flow polypropylene (Huntsman formula P4G3Z039) in quantities sufficient to give 1, 2, and 4 wt % in the extruded film.

EXAMPLE 4

Example 1 was repeated, but using 360, 475, and 600 F temperatures for extrusion of the 3-mil (75 micron) thick film.

EXAMPLE 5

Example 1 was repeated, with the change that the pelleted extrudate was extruded as a ~1-mil film onto white paper.

Comparative Examples

Table 1 clearly shows the beneficial effect of the non-polar polyolefin additive on the exudation of the optical brighteners. Evaluation numbers 2 and 3, containing the non-polar polyolefin, show significantly less exudation (less b* change) than does Evaluation number 1. Evaluation number 6 shows very low optical brightener exudation compared to Evaluation number 5 which contains no additive. Evaluation number 11 is the blend of optical brighteners which was the subject of U.S. Pat. No. 4,859,539 (Tomko et al, Eastman Kodak Company). It can be seen from Table 1 that exudation of optical brighteners from polyethylene can be inhibited by use of the non-polar polyolefin additive, without restricting the brightener to the three-component mixture of brighteners described in U.S. Pat. No. 4,859,539.

Comparing Evaluation numbers 14 and 15, as well as 16–18 shows that the improvement also occurs when the compositions contain a rutile pigment. Both polypropylene alone and blends of polypropylene and a linear low-density polyethylene reduce the exudation rates of the brighteners.

Table 2 shows the effect of processing temperatures on the performance of the non-polar polyolefin additives. The greatest effect (lowest exudation) is seen when both the highest compounding temperature and film extrusion temperature are used (Evaluation numbers 3 and 6.

Table 3 shows that brightener loss from anatase-pigmented polyethylene coated on paper is also very low when a non-polar polyolefin additive (in the column labeled "Polymer") is present.

Table 4 shows that either a single component brightener (C, Table 1), or a mixture of brighteners (A and C), under go very little loss from rutile-pigmented polyethylene coated on paper when a non-polar polyolefin additive is present. In fact, the level of brightness after ageing is greater than that exhibited by the mixture of brighteners A, B, and C described in U.S. Pat. No. 4,794,071.

TABLE 1

Optical Brightener Exudation Comparisons of 3-mil films extruded at 360° F.

| Evaluation Number | Weight % of Optical Brightener | | | | Non-Polar Polyolefin | Wt. % | Yellowness (b*) After 60° C. Ageing | | b* Change |
|---|---|---|---|---|---|---|---|---|---|
| | A | B | C | D | | | 0 Hrs. | 88 Hrs. | |
| 1 | 0.025 | | | | None | — | −7.39 | 0.73 | 8.12 |
| 2 | 0.025 | | | | Poly-P | 1 | −6.73 | −1.19 | 5.54 |
| 3 | 0.025 | | | | Poly-P | 2 | −8.77 | −3.12 | 5.65 |
| 4 | 0.025 | | | | Poly-P | 4 | −7.57 | −1.61 | 5.96 |
| 5 | 0.0143 | | 0.012 | | None | — | −7.59 | −3 | 4.59 |
| 6 | 0.0143 | | 0.012 | | Poly-P | 2 | −7.12 | −5.55 | 1.57 |
| 7 | 0.0225 | | 0.0025 | | None | — | −8.31 | −4.05 | 4.26 |
| 8 | 0.0225 | | 0.0025 | | Poly-P | 1 | −6.78 | −6.14 | 0.64 |
| 9 | 0.0225 | | 0.0025 | | Poly-P | 2 | −8.82 | −8.84 | −0.02 |
| 10 | 0.0225 | | 0.025 | | Poly-P | 2 | −7.96 | −7.76 | 0.2 |
| 11 | 0.00625 | 0.015 | 0.00375 | | None | — | −7.62 | −7.49 | 0.13 |
| 12 | 0.0125 | 0.03 | 0.0075 | | None | — | −9.12 | −5.48 | 3.64 |
| 13 | 0.0125 | 0.03 | 0.0075 | | Poly-P | 4 | −7.77 | −7.57 | 0.2 |
| 14 | 0.0123 | 0.015 | 0.011 | 0.025 | None | — | −3.86 | −1.1 | 2.76 |
| 15 | 0.0123 | 0.015 | 0.011 | 0.025 | 1:1 Poly-P:LLDPE | 2 | −4.14 | −2.7 | 1.44 |
| 16 | 0.0145 | | 0.0135 | 0.025 | None | | −3.51 | 0.19 | 3.7 |
| 17 | 0.0145 | | 0.0135 | 0.025 | 1:1 Poly-P:LLDPE | 2 | −3.47 | −2.43 | 1.04 |
| 18 | 0.0145 | | 0.0135 | 0.025 | Poly-P | 2 | −3.44 | −0.73 | 2.71 |

Poly-P is Polypropylene
LLDPE is a butene-modified Linear Low-Density Polyethylene
Optical Brightener:
A is 4,4'-bis(Benzoxazol-2-yl)stilbene
B is Methyl-4,4'-bis(benzoxazol-2-yl)stilbene
C is Dimethyl-4,4'-bis(benzoxazol-2-yl)stilbene
D is 2,5-bis(t-Butyl-benzoxazol-2-yl)thiophene
Evaluations 1–13 contain 15 wt. % of an anatase $TiO_2$, while Evaluations 14–18 contain 15 wt. % of a Rutile $TiO_2$.

TABLE 2

Compounding and Extrusion Temperature Effects on Brightener Exudation

| Evaluation Number* | Compounding Temp. ° F. | Film Extrusion Temp. ° F. | b* Values after 60° C. Ageing for Hrs Indicated | | |
|---|---|---|---|---|---|
| | | | 0 | 44 | 88 |
| 1 | 350 | 360 | −8.19 | 0.72 | 4.09 |
| 2 | 350 | 475 | −8.46 | −2.78 | 1.18 |
| 3 | 350 | 600 | −8.98 | −8.15 | −5.61 |
| 4 | 450 | 360 | −8.50 | −2.43 | 1.00 |
| 5 | 450 | 475 | −8.57 | −4.15 | 1.99 |
| 6 | 450 | 600 | −8.74 | −8.42 | −6.89 |

TABLE 2-continued

Compounding and Extrusion Temperature Effects on Brightener Exudation

| Evaluation Number* | Compounding Temp. °F. | Film Extrusion Temp, °F. | b* Values after 60° C. Ageing for Hrs Indicated | | |
|---|---|---|---|---|---|
| | | | 0 | 44 | 88 |

*All Formulations contained 4 wt % Polypropylene, 500 ppm of the brightener mixture of Example 1, and 15 wt % of an anatase titanium dioxide.

TABLE 3

Brightening of Anatase-Pigmented Paper Coating Formulations

| Brightener* | Polymer | b* Values After 60 C. Ageing for Hrs Indicated | |
|---|---|---|---|
| | | 0 | 115 |
| 500 ppm Brightener A, Table 1 | None | −7.21 | −4.29 |
| 50 ppm Brightener A, 450 ppm Brightener C, Table 1 | 4% Polypropylene | −7.10 | −6.90 |

*Formulations contain 15 wt % Anatase titanium dioxide, and were coated onto white paper at 590–630° F.

TABLE 4

Brightening of Rutile-Pigmented Paper Coating Formulations

| Brightener* | Polymer | b* Values After 60 C. Ageing for Hrs Indicated | |
|---|---|---|---|
| | | 0 | 115 |
| 500 ppm Brightener C, (See Table 1) | 4% Polypropylene | −2.42 | −2.36 |
| 50 ppm Brightener A, 450 ppm Brightener C, (See Table 1) | 4% Polypropylene | −2.19 | −2.10 |
| 125 ppm Brightener A, 300 ppm Brightener B, 75 ppm Brightener C, (See Table 1) | None | −1.99 | −1.80 |

*Formulations contain 15 wt % Rutile titanium dioxide, and were coated onto white paper at 590–630 F.

I claim:

1. A thermoplastic composition comprising a non-polar thermoplastic polymer selected from the group consisting of polymers of ethylene, styrene, α-methyl styrene, and mixtures thereof, an optical brightener selected from the group consisting of 4,4'-bis(benzoxazol-2-yl)stilbene, monomethyl-4,4'-bis(benzoxazol-2-yl)stilbene, dimethyl-4,4'-bis(benzoxazol-2-yl)stilbene and mixtures thereof, and from about 0.5 weight percent to about 6 weight percent of a non-polar polyolefin additive selected from the group consisting of polypropylene and polybutylene and wherein the weight percent of said non-polar polyolefin additive is based on the total weight of said non-polar polyolefin additive and said non-polar thermoplastic polymer and wherein a 3 mil film of said thermoplastic composition aged in a Blue M convection oven at 60° C. for 88 hours has a lower change in b* relative to a thermoplastic composition without said non-polar polyolefin additive.

2. The composition of claim 1 wherein said thermoplastic polymer is a polyethylene homopolymer or polyethylene interpolymer and has a density of from about 0.90 grams/cm$^3$ to about 0.96 grams/cm$^3$.

3. The composition of claim 1 wherein said thermoplastic polymer is a polyethylene homopolymer or polyethylene interpolymer and has a density of from about 0.910 grams/cm$^3$ to about 0.925 grams/cm$^3$.

4. The composition of claim 1 wherein said optical brightener absorbs light having a wavelength of 280–405 nm and emits light having a wavelength of about 400–450 nm.

5. The composition of claim 1 wherein the amount of optical brightener added to said thermoplastic polymer is from about 0.001 percent to about 1.0 percent by weight based on the total weight of the thermoplastic polymer and non-polar polyolefin additive.

6. The composition of claim 1 wherein the amount of optical brightener added to said non-polar thermoplastic polymer is from about 0.01 percent to about 0.25 percent by weight based on the total weight of the non-polar thermoplastic polymer and non-polar polyolefin additive.

7. The composition of claim 1 further comprising additives selected from the group consisting of colorants, white pigments, antioxidants, heat stabilizers, antistatic agents, dispersing agents, coating aids, ultraviolet stabilizers, fillers, processing aids, slip agents, lubricants and mixtures thereof.

8. The composition of claim 7 wherein said additives are selected from the group consisting of pigments; titanium dioxide; zinc oxide; dyes; 4,4'-butylidene-bis(6-tert-butyl-meta-cresol); di-lauryl-3,3'-thiodipropionate; hindered amine light stabilizers (HALS); N-butylated-p-aminophenol; tetra(2,4-di-tert-butylphenyl)-4,4'-diphenyldiphenyl-diphosphonite; 2,6-di-tert-butyl-p-cresol; 2,6-di-tert-butyl-4-methylphenol; N,N-disalicylidene-1,2-diaminopropane; octadecyl 3-(3',5'-di-tert-butyl-4'-hydroxyphenyl propionate); sodium stearate; potassium stearate; lithium stearate; magnesium stearate; calcium stearate; zinc stearate; aluminum stearate; calcium palmitate; sodium palmitate; zirconium octylate; sodium laurate; salts of benzoic acid selected from sodium benzoate, calcium benzoate, magnesium benzoate and zinc benzoate; and mixtures thereof.

9. A method for reducing the exudation of optical brighteners in a thermoplastic composition having a non-polar thermoplastic polymer and an optical brightener, said method consisting essentially of blending with said non-polar thermoplastic polymer from about 0.5 weight percent to about 6 weight percent of a non-polar polyolefin additive selected from the group consisting of polypropylene and polybutylene, wherein said non-polar thermoplastic polymer is selected from the group consisting of polymers of ethylene, styrene, α-methyl styrene, and mixtures thereof and said optical brightener is selected from the group consisting of 4,4'-bis(benzoxazol-2-yl)stilbene, monomethyl-4,4'-bis(benzoxazol-2-yl)stilbene, dimethyl-4,4'-bis(benzoxazol-2-yl)stilbene and mixtures thereof, and wherein the weight percent of said non-polar polyolefin additive is based on the total weight of said non-polar polyolefin additive and said non-polar thermoplastic polymer; and extruding said thermoplastic blend composition at a temperature of about 550° to 650° F., and wherein a 3 mil film of said thermoplastic composition aged in a Blue M convection oven at 60° C. for 88 hours has a lower change in b* relative to a thermoplastic composition without said non-polar polyolefin additive.

10. An imaging support comprising a paper base material having a composition coated on a front side thereof, said composition comprising a non-polar thermoplastic polymer selected from the group consisting of polymers of ethylene, styrene, α-methyl styrene, and mixtures thereof, an optical brightener selected from the group consisting of 4,4'-bis (benzoxazol-2-yl)stilbene, monomethyl-4,4'-bis (benzoxazol-2-yl)stilbene, dimethyl-4,4'-bis(benzoxazol-2-yl)stilbene and mixtures thereof, and from about 0.5 weight percent to about 6 weight percent of a non-polar polyolefin additive selected from the group consisting of polypropylene and polybutylene, wherein the weight percent of said non-polar polyolefin additive is based on the total weight of said non-polar polyolefin additive and said non-polar thermoplastic polymer, and wherein a 3 mil film of said thermoplastic composition aged in a Blue M convection oven at 60° C. for 88 hours has a lower change in b* relative to a thermoplastic composition without said non-polar polyolefin additive.

11. The imaging support of claim 10, wherein said paper base is selected from the group consisting of thermal, digital and photographic paper.

12. A shaped or formed article comprised of a thermoplastic composition consisting essentially of a non-polar thermoplastic polymer, selected from the group consisting of ethylene, styrene, α-methyl styrene, and mixtures thereof, an optical brightener selected from the group consisting of 4,4'-bis(benzoxazol-2-yl)stilbene, monomethyl-4,4'-bis (benzoxazol-2-yl)stilbene, dimethyl-4,4'-bis(benzoxazol-2-yl)stilbene and mixtures thereof and from about 0.5 weight percent to about 6 weight percent of a non-polar polyolefin additive selected from the group consisting of polypropylene and polybutylene, wherein the weight percent of said non-polar polyolefin additive is based on the total weight of said non-polar polyolefin additive and said non-polar thermoplastic polymer, and wherein a 3 mil film of said thermoplastic composition aged in a Blue M convection oven at 60° C. for 88 hours has a lower change in b* relative to a thermoplastic composition without said non-polar polyolefin additive.

13. The article of claim 12 in the form of a film.

14. The article of claim 12 in the form of a sheet.

15. The article of claim 12 in the form of a bottle.

16. A thermoplastic composition consisting essentially of a non-polar thermoplastic polymer selected from the group consisting of polymers of ethylene, styrene, α-methyl styrene, and mixtures thereof, an optical brightener selected from the group consisting of 4,4'-bis(benzoxazol-2-yl) stilbene, monomethyl-4,4'-bis(benzoxazol-2-yl)stilbene, dimethyl-4,4'-bis(benzoxazol-2 -yl)stilbene and mixtures thereof, and from about 0.5 weight percent to about 6 weight percent of a non-polar polyolefin additive selected from the group consisting of polypropylene and polybutylene and wherein the weight percent of said non-polar polyolefin additive is based on the total weight of said non-polar polyolefin additive and said non-polar thermoplastic polymer, and wherein a 3 mil film of said thermoplastic composition aged in a Blue M convection oven at 60° C. for 88 hours has a lower change in b* relative to a thermoplastic composition without said non-polar polyolefin additive.

17. The thermoplastic composition of claim 16 further including an additive selected from the group consisting of pigments; titanium dioxide; zinc oxide; dyes; 4,4'-butylidene-bis(6-tert-butyl-meta-cresol); di-lauryl-3,3'-thiodipropionate; hindered amine light stabilizers (HALS); N-butylated-p-aminophenol; tetra(2,4-di-tert-butylphenyl)-4,4'-diphenyldiphenyl-diphosphonite; 2,6-di-tert-butyl-p-cresol; 2,6-di-tert-butyl-4-methylphenol; N,N-disalicylidene-1,2-diaminopropane; octadecyl 3-(3',5'-di-tert-butyl-4'-hydroxyphenyl propionate); sodium stearate; potassium stearate; lithium stearate; magnesium stearate; calcium stearate; zinc stearate; aluminum stearate; calcium palmitate; sodium palmitate; zirconium octylate; sodium laurate; salts of benzoic acid selected from sodium benzoate, calcium benzoate, magnesium benzoate and zinc benzoate; and mixtures thereof.

18. The thermoplastic composition of claim 16 wherein the amount of said optical brightener added to said non-polar thermoplastic polymer is from about 0.01 percent to about 0.25 percent by weight based on the total weight of the non-polar thermoplastic polymer and non-polar polyolefin additive.

19. An imaging support comprising a paper base material having a composition coated on a front side thereof, said composition consisting essentially of a non-polar thermoplastic polymer selected from the group consisting of polymers of ethylene, styrene, α-methyl styrene, and mixtures thereof, an optical brightener selected from the group consisting of 4,4'-bis(benzoxazol-2-yl) stilbene, monomethyl-4, 4'-bis(benzoxazol-2-yl)stilbene, dimethyl-4,4'-bis (benzoxazol-2-yl) stilbene and mixtures thereof, and from about 0.5 weight percent to about 6 weight percent of a non-polar polyolefin additive selected from the group consisting of polypropylene and polybutylene, and wherein the weight percent of said non-polar polyolefin additive is based on the total weight of said non-polar polyolefin additive and said non-polar thermoplastic polymer, and wherein a 3 mil film of said thermoplastic composition aged in a Blue M convection oven at 60° C. for 88 hours has a lower change in b* relative to a thermoplastic composition without said non-polar polyolefin additive.

20. The imaging support of claim 19 further including an additive selected from the group consisting of pigments; titanium dioxide; zinc oxide; dyes; 4,4'-butylidene-bis(6-tert-butyl-meta-cresol); di-lauryl-3,3'-thiodipropionate; hindered amine light stabilizers (HALS); N-butylated-p-aminophenol; tetra(2,4-di-tert-butylphenyl)-4,4'-diphenyldiphenyl-diphosphonite; 2,6-di-tert-butyl-p-cresol; 2,6-di-tert-butyl-4-methylphenol; N,N-disalicylidene-1,2-diaminopropane; octadecyl 3-(3',5'-di-tert-butyl-4'-hydroxyphenyl propionate); sodium stearate; potassium stearate; lithium stearate; magnesium stearate; calcium stearate; zinc stearate; aluminum stearate; calcium palmitate; sodium palmitate; zirconium octylate; sodium laurate; salts of benzoic acid selected from sodium benzoate, calcium benzoate, magnesium benzoate and zinc benzoate; and mixtures thereof.

* * * * *

UNITED STATES PATENT AND TRADEMARK OFFICE
CERTIFICATE OF CORRECTION

PATENT NO. : 6,565,987 B2
DATED : May 20, 2003
INVENTOR(S) : Irick

It is certified that error appears in the above-identified patent and that said Letters Patent is hereby corrected as shown below:

Column 9,
Line 62, -- yellowness -- should be inserted before "b*".

Column 10,
Line 60, -- yellowness -- should be inserted before "b*".

Column 11,
Lines 11, 32 and 53, -- yellowness -- should be inserted before "b*".

Column 12,
Line 38, -- yellowness -- should be inserted before "b*".

Signed and Sealed this

Second Day of September, 2003

JAMES E. ROGAN
*Director of the United States Patent and Trademark Office*